United States Patent [19]

Stumpe

[11] Patent Number: 4,597,610
[45] Date of Patent: Jul. 1, 1986

[54] LOAD-DEPENDENT BRAKE FORCE GOVERNOR

[75] Inventor: Werner Stumpe, Kornwestheim, Fed. Rep. of Germany

[73] Assignee: Robert Bosch GmbH, Stuttgart, Fed. Rep. of Germany

[21] Appl. No.: 179,605

[22] Filed: Aug. 19, 1980

[30] Foreign Application Priority Data

Sep. 25, 1979 [DE] Fed. Rep. of Germany ....... 2938718

[51] Int. Cl.$^4$ ............................................... B60T 8/18
[52] U.S. Cl. .................................................. 303/22 R
[58] Field of Search ................. 303/13, 22 R, 40, 152; 188/195

[56] References Cited

U.S. PATENT DOCUMENTS

| | | | |
|---|---|---|---|
| 3,032,982 | 2/1967 | Pekrul | 303/22 R X |
| 3,937,975 | 2/1976 | Yanagawa et al. | 303/22 R |
| 4,145,089 | 3/1979 | Reinecke et al. | 303/22 R |
| 4,223,955 | 9/1980 | Reinecke | 303/22 R |

Primary Examiner—Duane A. Reger
Attorney, Agent, or Firm—Edwin E. Greigg

[57] ABSTRACT

A load-dependent brake force governor is proposed, in which the actuation linkage which influences the governor valve is additionally used for the purpose of actuating a signal transducer which then produces a load-dependent signal. The signal transducer can be either a control valve (FIG. 1) or an inductive transducer (FIG. 2). In this manner, even when the brake is not actuated, a load-dependent signal is available for use, with which further devices, such as an engine brake or a retarder, an axle load indicator or a headlight range control means, can be actuated. A supplementary pickup of the movement of the vehicle chassis can be omitted. The brake force governor is preferably applicable to motor vehicles.

4 Claims, 2 Drawing Figures

LOAD-DEPENDENT BRAKE FORCE GOVERNOR

BACKGROUND OF THE INVENTION

The invention relates to a load-dependent brake force governor for a motor vehicle brake system having a governor valve for monitoring a passageway for a brake medium, a control piston, and an actuation linkage which is connected to a vehicle axle and which acts upon the control piston and a governor valve. A brake force governor of this kind is known described in U.S. Pat. No. 3,186,771 issued June 1, 1965 to Alfieri.

In these brake force governors, when the vehicle axle performs a certain movement, a lever is pivoted which rotates a shaft supported in the brake force governor. A cam secured on this shaft influences the governor valve in the brake force governor by way of a cam contour. In this manner, when there is a large vehicle load, a high brake pressure is directed into the wheel brake cylinder, and when there is a small vehicle load, a low brake pressure is supplied.

In some vehicles there is the necessity of actuating other devices as well, such as an engine brake or a retarder, an axle load indicator or a headlight range control means, in accordance with the vehicle load prevailing at a particular time. If it is intended to perform an actuation of this kind with the known brake force governor, only the brake pressure being exerted can be picked up as a transducer pressure. If braking is not being performed at a particular time, then a transducer pressure of this kind is not available for use.

OBJECT AND SUMMARY OF THE INVENTION

The load-dependent brake force governor described herein is similar to the known type of load-dependent brake force governors described above, but has the advantage over the prior art that a load-dependent signal is available for use and can be picked up or read out for use at all times. The signal transducer can be either a control valve (either hydraulic or pneumatic) or an inductive transducer. It may be integrated with the brake force governor or can be mounted externally on its housing.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
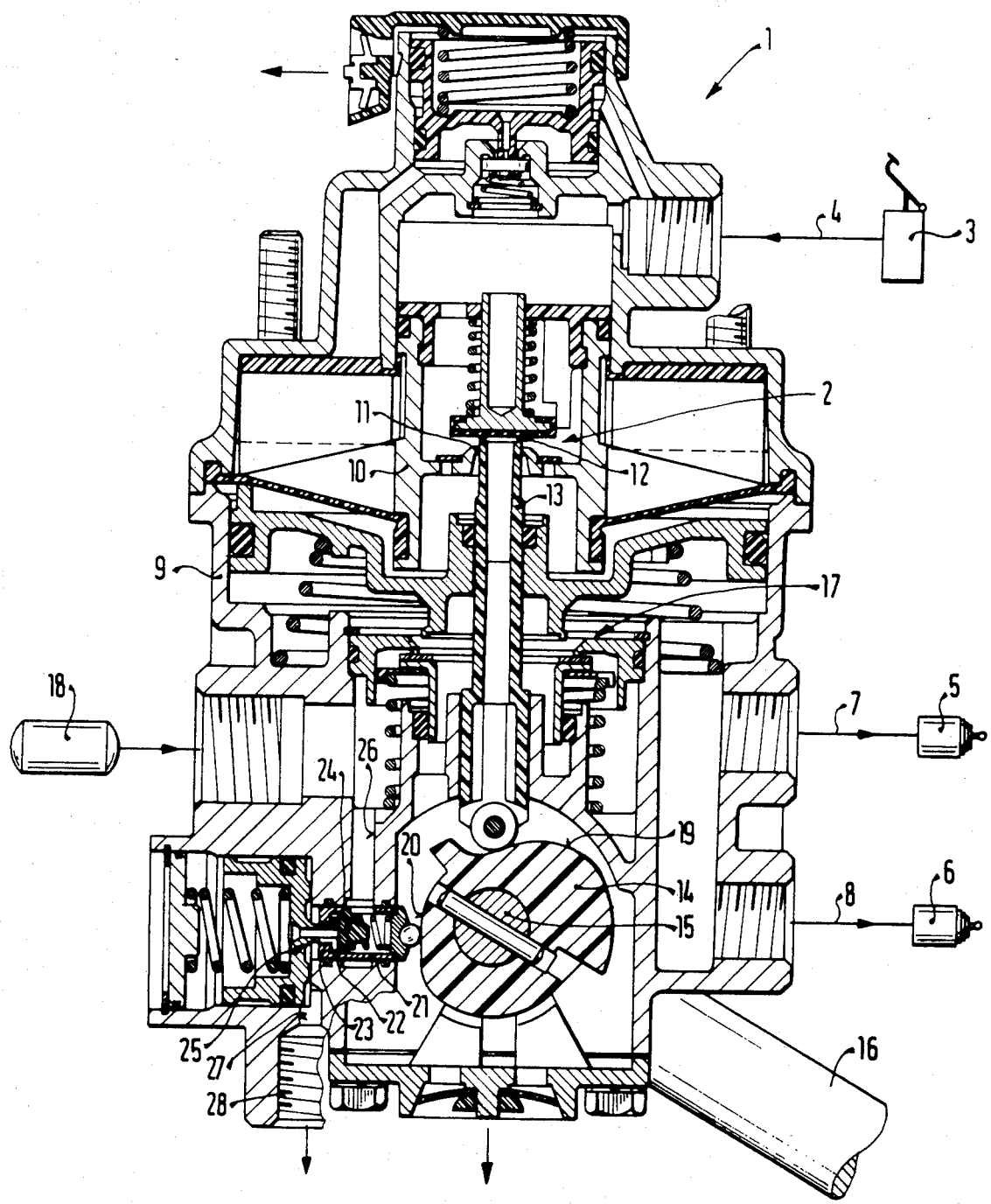
FIG. 1 shows a cross-sectional view of a brake force governor having a control valve as its signal transducer.

A load-dependent brake force governor 1 has a governor valve 2, with which a passageway for pressure medium, leading from a brake line section 4 communicating with a brake valve 3 to a brake line section 7, 8 adjoining two brake cylinders 5 and 6, can be monitored depending upon the load of a vehicle axle, preferably the rear axle.

A control piston 10 is disposed in a housing 9 of the brake force governor 1 and carries a valve seat 11 of the governor valve 2. A second valve seat 12 is formed on the end of a hollow push rod 13, which is adjustable via an actuation cam 14 supported in the housing 9. The cam 14 is seated upon an actuation shaft 15, which is rotatable by a lever 16 communicating with the vehicle axle. A relay valve 17 is also disposed in the brake force governor 1, but this relay valve 17 is not essential to the invention. The brake cylinders 5, 6 are supplied via the relay valve 17 not directly from the brake valve 3 but rather from a special supply container 18. A supplementary control of this kind may, however, also be omitted.

In order to actuate the hollow push rod 13, the actuation cam 14 has a control contour 19. A second control contour 20 is also provided on the cam 14, and a sleeve element 21 carrying a valve seat 22 can be displaced with this second control contour 20. A second valve seat 23 is located inside the valve seat 22, and a closing body 24 is provided which cooperates with both valve seats 22 and 23. The elements 21-24 comprise a signal transducer 25, which is located in a connecting line 26, 27 between the supply container 18 and a housing connector 28. In the exemplary embodiment under discussion, the signal transducer 25 is pneumatic; however, it can equally well be embodied as a hydraulic signal transducer.

Mode of Operation:

Upon braking, the load-dependent brake force governor monitors the supply of the brake cylinders 5 and 6 with air for braking in accordance with the load-dependent displacement of the actuation cam 14.

Independently of whether braking is taking place at a particular time or not, the signal transducer 25 functions continuously, because the cam 14 is displaced each time there is a change in the distance between the vehicle chassis and the vehicle axle. In accordance with the design of the control contour 20, the signal transducer 25 supplies controlling air via the connector 28 to other devices, such as to an engine brake or a retarder, an axle load indicator or a headlight range control means, where the load-dependent signals are correspondingly evaluated.

Figure 2:
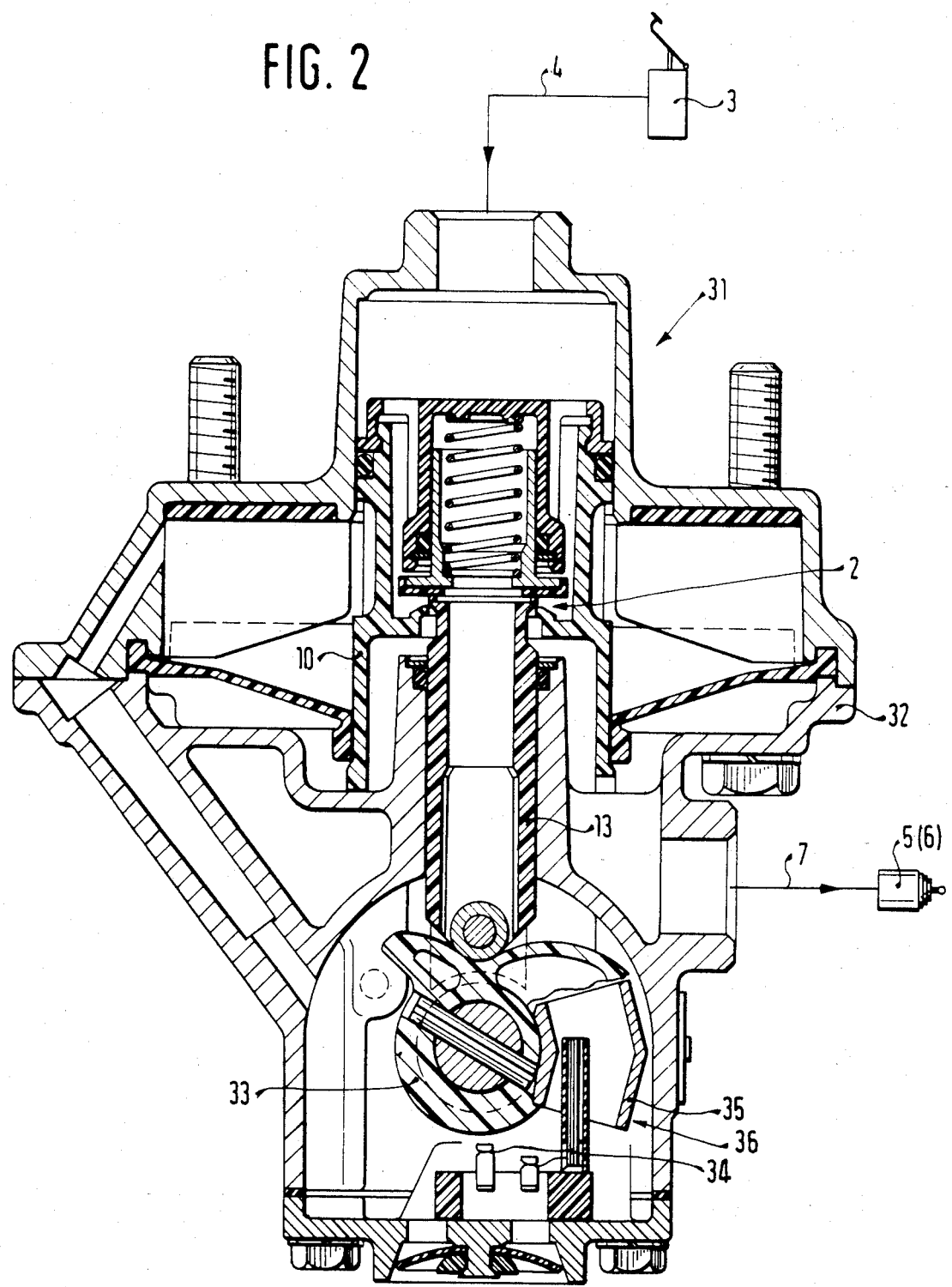
FIG. 2 shows a brake force governor having an inductive transducer as its signal transducer.

In FIG. 2, a brake force governor generally similar to that of FIG. 1 is shown. Corresponding elements are accordingly assigned identical reference numerals. This brake force governor 31 has a housing 32, in which a coil 34 is disposed in the region of an actuation cam 33. A short-circuit angular sleeve member 35 which is secured on the actuation cam 33 engages this coil 34 from the top. The coil 34 and the short-circuit sleeve member 35 form an inductive transducer 36, which is continuously actuated—again, independently of the braking process—when there is a certain movement of the axle. Depending on the embodiment and disposition of the short-circuit sleeve member 35 and the rotary angle of the cam 33, the signal transducer 36 sends an electrical signal to other devices, such as an engine brake or a retarder, an axle load indicator or a headlight range control means, where the load-dependent signals are correspondingly evaluated.

The signal transducers 25 and 36 may either be integrated in the brake force governors 1 and 31—as in the exemplary embodiments discussed above—or can be flanged to the housing 9 and 32. When signal transducers 25 and 36 of that kind are used, a supplementary pickup of the movement of the vehicle chassis can be omitted.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A load-dependent brake force governor for motor vehicle brake systems, having a governor valve arranged to monitor a passageway for a brake medium, said governor valve connected to a control piston, further wherein said control piston and said governor valve are connected to a vehicle axle by an actuation linkage, characterized in that a signal transducer for producing a load-dependent signal is associated with a housing of the brake force governor, an actuation shaft which is rotatable in accordance with load via a lever connected to said vehicle axle, said actuation shaft provided with a cam, and said cam is provided with means for actuating said signal transducer.

2. A load-dependent brake force governor as defined by claim 1, characterized in that said signal transducer includes a control valve which is switchable by a control contour disposed on said cam.

3. A load-dependent brake force governor as defined by claim 2, characterized in that said signal transducer is an inductive transducer.

4. A load-dependent brake force governor as defined by claim 2, characterized in that said signal transducer includes a coil which is associated with said housing and that a short-circuit sleeve member which cooperates with said coil is secured on said cam.

* * * * *